US011633850B2

(12) United States Patent
Hwang et al.

(10) Patent No.: US 11,633,850 B2
(45) Date of Patent: Apr. 25, 2023

(54) TACTILE SENSOR MODULE FOR ROBOT-HAND AND GRASPING METHOD USING THE SAME

(71) Applicant: KOREA INSTITUTE OF SCIENCE AND TECHNOLOGY, Seoul (KR)

(72) Inventors: Donghyun Hwang, Seoul (KR); Sungwoo Park, Seoul (KR)

(73) Assignee: Korea Institute of Science and Technology, Seoul (KR)

(*) Notice: Subject to any disclaimer, the term of this patent is extended or adjusted under 35 U.S.C. 154(b) by 318 days.

(21) Appl. No.: 17/103,019

(22) Filed: Nov. 24, 2020

(65) Prior Publication Data
US 2021/0394360 A1    Dec. 23, 2021

(30) Foreign Application Priority Data
Jun. 18, 2020   (KR) .................. 10-2020-0074170

(51) Int. Cl.
*B25J 9/16* (2006.01)
*B25J 13/08* (2006.01)
(Continued)

(52) U.S. Cl.
CPC .......... *B25J 9/1612* (2013.01); *B25J 9/1633* (2013.01); *B25J 9/1694* (2013.01); *B25J 13/082* (2013.01);
(Continued)

(58) Field of Classification Search
CPC ...... B25J 9/1612; B25J 9/1633; B25J 9/1694; B25J 13/082; B25J 13/084; B25J 13/088; B25J 15/0009; B25J 15/0206; B25J 19/02
(Continued)

(56) References Cited

U.S. PATENT DOCUMENTS 5,200,679 A * 4/1993 Graham ............... B25J 15/0009
901/33
7,296,835 B2 * 11/2007 Blackwell ........... B25J 15/0009
294/111
(Continued)

FOREIGN PATENT DOCUMENTS

JP          8323678 A    12/1996
JP     2006043843 A     2/2006
(Continued)

OTHER PUBLICATIONS

Lael U. Odhner et al., "A compliant, underactuated hand for robust manipulation", The International Journal of Robotics Research, 2014, pp. 736-752, vol. 33, No. 5.
(Continued)

*Primary Examiner* — Jaime Figueroa
(74) *Attorney, Agent, or Firm* — Rabin & Berdo, P.C.

(57) ABSTRACT

This disclosure relates to a technology for grasping an object while adjusting a grasping force according to stiffness of the object measured by a tactile sensor module, especially to a robot-hand, which includes a tactile sensor module for measuring a normal force applied when grasping an object, a phalange sensor module having an actuator to generate a driving force and configured to measure a rotational displacement of a motor, and a hand back control unit for operating the actuator by generating a desired displacement signal to control a grasping force so that a grasping motion is stably and accurately achieved by applying a minimum grasping force to soft object with no sliding and minimized deformation, wherein the desired displacement signal is generated based on stiffness which is calculated from the normal force data and the rotational displacement data.

15 Claims, 16 Drawing Sheets

(51) Int. Cl.
  B25J 15/00 (2006.01)
  B25J 15/02 (2006.01)
(52) U.S. Cl.
  CPC ........... B25J 13/084 (2013.01); B25J 13/088 (2013.01); B25J 15/0009 (2013.01); B25J 15/0206 (2013.01)
(58) Field of Classification Search
  USPC ................. 700/245–264; 318/568.11–568.25
  See application file for complete search history.

(56) References Cited

U.S. PATENT DOCUMENTS

| | | | | |
|---|---|---|---|---|
| 8,498,741 | B2* | 7/2013 | Ihrke | B25J 17/0258 |
| | | | | 901/36 |
| 8,562,049 | B2* | 10/2013 | Ihrke | B25J 9/104 |
| | | | | 901/28 |
| 8,662,552 | B2* | 3/2014 | Torres-Jara | B25J 13/084 |
| | | | | 901/33 |
| 8,857,874 | B2* | 10/2014 | Ihrke | B25J 9/104 |
| | | | | 901/31 |
| 9,840,009 | B2* | 12/2017 | Laville | B25J 15/10 |
| 10,286,561 | B2* | 5/2019 | Miyazaki | B25J 9/142 |
| 10,426,638 | B2* | 10/2019 | Evans | A61F 2/585 |
| 11,117,268 | B2* | 9/2021 | Beevers | B25J 15/0009 |
| 11,464,655 | B2* | 10/2022 | Evans | A61F 2/70 |
| 2007/0035143 | A1* | 2/2007 | Blackwell | B25J 9/104 |
| | | | | 294/111 |
| 2008/0075561 | A1* | 3/2008 | Takemura | F16F 1/025 |
| | | | | 414/800 |
| 2009/0285664 | A1 | 11/2009 | Kim et al. | |
| 2011/0068595 | A1* | 3/2011 | Ihrke | B25J 15/08 |
| | | | | 901/32 |
| 2012/0013139 | A1* | 1/2012 | Torres-Jara | B25J 15/0009 |
| | | | | 901/34 |
| 2013/0168336 | A1 | 7/2013 | Kim et al. | |
| 2013/0193704 | A1* | 8/2013 | Ihrke | B25J 15/08 |
| | | | | 294/213 |
| 2013/0331949 | A1* | 12/2013 | Dehoff | B22F 10/20 |
| | | | | 623/26 |
| 2018/0168830 | A1* | 6/2018 | Evans | A61F 2/585 |
| 2020/0022824 | A1* | 1/2020 | Evans | A61F 2/70 |
| 2021/0356335 | A1* | 11/2021 | McMillen | B25J 13/085 |
| 2022/0287853 | A1* | 9/2022 | Ren | B25J 13/088 |

FOREIGN PATENT DOCUMENTS

| | | |
|---|---|---|
| JP | 2009125881 A | 6/2009 |
| JP | 2019198939 A | 11/2019 |
| KR | 101012739 B1 | 2/2011 |
| KR | 101312553 B1 | 10/2013 |
| KR | 101479232 B1 | 1/2015 |

OTHER PUBLICATIONS

Dong-Hyuk Lee et al., "KITECH-Hand: A Highly Dexterous and Modularized Robotic Hand", IEEE/ASME Transactions on Mechatronics, Apr. 2017, pp. 876-887, vol. 22, No. 2.

Tito Pradhono Tomo et al., "A New Silicone Structure for uSkin—A Soft Distributed, Digital 3-Axis Skin Sensor and Its Integration on the Humanoid Robot iCub", IEEE Robotics and Automation Letters, Jul. 2018, pp. 2584-2591, vol. 3, No. 3.

Tito Pradhono Tomo te al., "Covering a Robot Fingertip with uSkin: a Soft Electronic Skin with Distributed 3-axis Force Sensitive Elements for Robot Hands", IEEE Robotics and Automation Letters, Preprint Version, Jul. 2017, pp. 1-8.

* cited by examiner

TACTILE SENSOR MODULE FOR ROBOT-HAND AND GRASPING METHOD USING THE SAME

CROSS-REFERENCE TO RELATED APPLICATIONS

This application claims priority to Korean Patent Application No. 10-2020-0074170, filed on Jun. 18, 2020 and all the benefits accruing therefrom under 35 U.S.C. § 119, the contents of which in its entirety are herein incorporated by reference.

BACKGROUND

1. Field

This disclosure relates to a technology for grasping an object with a robot-hand while adjusting a grasping force according to stiffness of the object measured by a tactile sensor module. Specifically, this disclosure relates to a robot-hand, which includes a tactile sensor module in which a force sensor for measuring a normal force applied when grasping an object is installed on an inclined surface of a Flexible Printed Circuit Board (FPCB) assembly, a phalange sensor module having an actuator to generate a driving force for a grasping motion and configured to measure the normal force and a rotational displacement of a motor of the actuator when grasping the object, and a hand back control unit for operating the actuator by generating a desired displacement signal to control a grasping force based on the stiffness which is calculated from the measured normal force data and rotational displacement, so that a grasping motion is stably and accurately achieved by applying a minimum grasping force to grasp a soft object with no sliding and minimized deformation, and a grasping method using the same.

2. Description of the Related Art

In various fields such as industrial automation processes, medical devices and humanoid robots, a robot-hand is being used which has multiple fingers or even multiple phalanges. If the robot-hand is used for a grasping work that requires safety, such as manipulating an object that is particularly susceptible to deformation or causing a physical interaction with human, it is important to perform a grasping motion applying an accurate grasping force and minimizing deformation of the object.

Conventionally, grasping force of robot-hand was controlled in a way of detecting an object using a distance sensor. An example of the conventional robot-hand is disclosed in Korean Patent Registration No. 10-1479232. In addition, the grasping operation of the prior robot-hand is mainly performed based on visual information. However, since tactile information of an object such as stiffness and softness cannot be correctly detected only with visual feedback, there is a limit in implementing a precise grasping performance using tactile characteristics of the object. In addition, since non-linear characteristics such as friction force frequently appear in a robot-hand driving unit in the prior art, the value of the grasping force commanded by a controller may not match the actual force applied to an object, so an operator cannot perform the grasping work accurately according to a desired grasping strategy. As described above, in the conventional robot-hand, there is no means for tactile feedback by measuring the stiffness and deformation state of an object, and accordingly, there is a limitation in accurately grasping a soft object without deformation.

This disclosure is designed to overcome the limitations of the prior art, and the present disclosure is directed to provide a robot-hand capable of grasping a soft object with low deformation resistance while minimizing the deformation of the object. For this purpose, the present disclosure is directed to provide robot-hand including a tactile sensor module in which a plurality of force sensors are provided to each fingertip in a three-dimensional structure to measure a force applied to the finger when grasping the object, and controlling the grasping force in order to grasp the object with a minimum force by adaptation to the softness of the object detected based on intensity and distribution of the force measured by the tactile sensor module.

In addition, the present disclosure is directed to provide a technology for a tactile sensor module that may be easily mounted and used throughout the robot industry where precise tasks requiring tactile feedback of a terminal of an end-effector in an industrial robot to which a gripper and a tool are attached to perform a predetermined task, a robot-hand of a humanoid robot or a prosthetic hand, which mimics human hand movements are performed, by modulating all components necessary for controlling a force sensor and processing measured information in a tactile sensor module.

In order to accomplish the above object, the present disclosure provides a tactile sensor module 10 for a robot-hand 100, comprising: a force sensor 12 configured to measure a normal force applied when grasping an object M; a FPCB assembly 11 having an inclined surface to which the force sensor 12 is mounted to form a plurality of rows, the FPCB assembly 11 being configured to supply a power to the force sensor 12; a stress transfer element 13 formed at an upper portion of the FPCB assembly 11 to be spaced apart therefrom to accommodate the force sensor 12 therein, the stress transfer element 13 being configured to transfer the normal force applied by the object M to the force sensor 12; and a fingertip control unit 15 configured to collect, correct and output normal force data measured by the force sensor 12.

In addition, the present disclosure provides a robot-hand 100, comprising: a plurality of fingers 1, each having a tactile sensor module 10 and a plurality of phalange sensor modules 20 rotatably coupled by link members 120a, 120b, 120c, 120d; and a base 5 connected with the plurality of fingers 1 by a base link member 150 and having a hand back control unit 51 for controlling a grasping motion of the finger 1, the base 5 having a cover plate 52 installed at an outer surface thereof, wherein the tactile sensor module 10 is configured to measure a normal force applied when grasping an object M, the phalange sensor module 20 has an actuator 27 to generate a driving force for a grasping motion and is configured to measure the normal force and a rotational displacement of a motor of the actuator 27 when grasping the object M, and the hand back control unit 51 is configured to control a grasping force by receiving the normal force data and the rotational displacement data from the tactile sensor module 10 and the phalange sensor module 20.

In addition, the present disclosure provides a grasping method for grasping an object M using a robot-hand 100 having a tactile sensor module 10 at a finger 1, the grasping method comprising: generating a velocity command in a grasping direction (+V) so that the tactile sensor module 10 contacts the object M, and grasping the object M by the robot-hand 100 (S1); determining whether any force sensor 12 provided to the tactile sensor module 10 is activated as a normal force (F) over a threshold value ($F_{th}$) is applied to the force sensor 12 (S2); counting the number ($S_{tot}$) of activated force sensors 12 (S3); determining whether the number ($S_{tot}$) of activated force sensors 12 is greater than a predetermined value ($S_{init}$) (S4); maintaining a grasping motion of the robot-hand 100 during a predetermined time ($T_{init}$) (S5); generating a velocity command in a reverse grasping direction (−V) to decrease the grasping force of the robot-hand 100 (S6); and determining whether the number ($S_{tot}$) of activated force sensors 12 is equal to the predetermined value ($S_{init}$) (S7).

In the tactile sensor module 10 of the present disclosure, the robot-hand 100 including the same and the grasping method using the same as described above, stiffness of the object M may be measured from the normal force data and the rotational displacement data, and the hand back control unit 51 generates a desired displacement signal based on the stiffness and transfers the desired displacement signal to the actuator 27 to control the grasping force applied to the object M.

In addition, the phalange sensor module 20 may include: a force sensor 22 configured to measure a normal force applied when grasping the object M; a Printed Circuit Board (PCB) assembly 21 having a first PCB 211 having an outer surface on which the plurality of force sensors 22 are attached and a second PCB 212 coupled to face the first PCB 211 by a connection FPCB 213, the PCB assembly 21 being configured to supply a power to the force sensor 22; a stress transfer plate 23 formed at an upper portion of the first PCB 211 to be spaced apart therefrom to accommodate the force sensor 22 therein, the stress transfer plate 23 being configured to transfer the normal force applied by the object M to the force sensor 22; a phalange control unit 25 configured to collect, correct and output normal force data measured by the force sensor 22; and an actuator 27 installed between the first PCB 211 and the second PCB 212 to generate a driving force for a grasping motion. At this time, the motor of the actuator 27 may include a position sensor 28 for measuring a rotational displacement when grasping the object M. In addition, the phalange control unit 25 may be configured to collect and output the rotational displacement data, and to transfer said normal force data and said rotational displacement data to the hand back control unit 51.

Moreover, the stress transfer element 13 may be made of a urethane rubber and formed on the FPCB assembly 11 by casting and curing, and the stress transfer plate 23 may be made of a silicone molding material and formed on the PCB assembly 21 by casting and curing.

According to the present disclosure, the stiffness of the object is measured based on the intensity and distribution of the force detected by the tactile sensor module, and a minimum amount of grasping force capable of accurately grasping the object with no sliding and minimized deformation is applied the object according to the identified softness to make the grasping motion of the robot-hand, so the object may be grasped safely and accurately.

In addition, according to the present disclosure, a tactile sensor module provided to the fingertip is configured such that a plurality of force sensors are arranged on a three-dimensional FPCB assembly at high density, and a soft stress transfer element is configured to surround the FPCB assembly. Thus, the distribution of force applied to the finger may be detected with a high-density setting, and the sensor performance (high signal bandwidth, linearity, and resolution, etc.) may be greatly improved. In addition, since the stress transfer element for transferring the normal force to the force sensor is made of an elastic material, it is possible to improve the accuracy of the grasping operation by more accurately figuring out the softness and grasping state of the grasped object, compared to a hard material.

According to the present disclosure, since the softness of the object, which is tactile information based on the information measured by the sensor module of the finger, is provided as feedback information to the external interface and the hand back control unit capable of tactile feedback, an operator of the robot-hand may perceive the inherent characteristics and the grasping state of the object by tactile sense.

DETAILED DESCRIPTION

The term "softness" used throughout this specification and claims refers to a property of an object, which is liable to be deformed and destroyed when an external force is applied thereto, resists deformation by an external force. In addition, the term "object" used throughout this specification is understood to have the same meaning as "an object to be grasped". Also, the term "robot-hand" used in this specification refers to a part of a robot to which terminal a tactile sensor module of the present disclosure to implement a tactile system, and should be understood as encompassing a gripper, an end effector and the like of industrial robots. In addition, the term "normal force" used in this specification refers to a force induced by an object in a vertical direction at a contact surface of a finger by the object, and is understood as a generic term generally indicating a normal external force applied to the finger of the robot-hand during grasping due to the object, including a reaction force induced by an object, a weight of the object, an external force and etc. applied to the finger.

Figure 1:
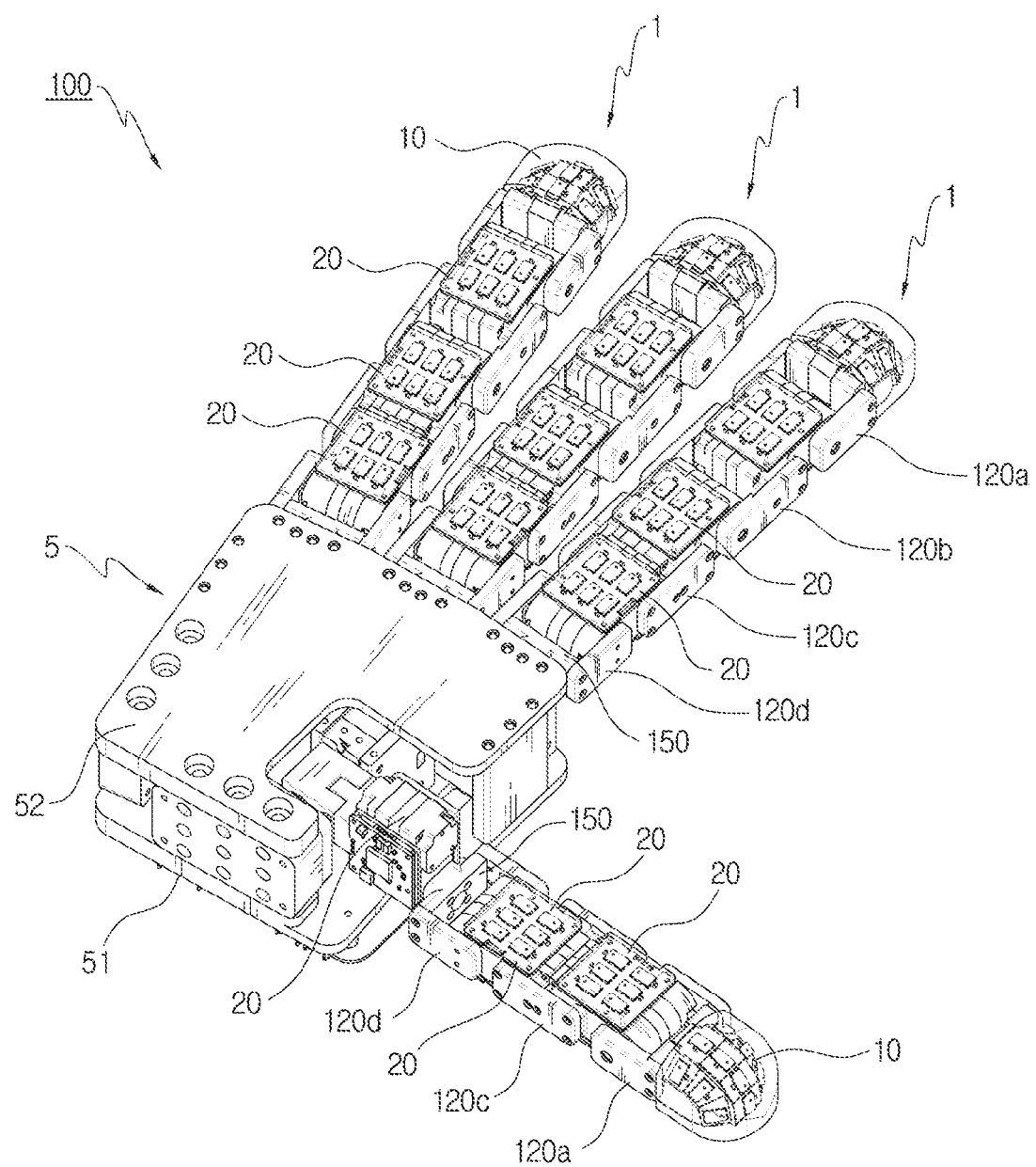
FIG. 1 is a schematic perspective view showing a robot-hand including a tactile sensor module according to the present disclosure.
Figure 2:
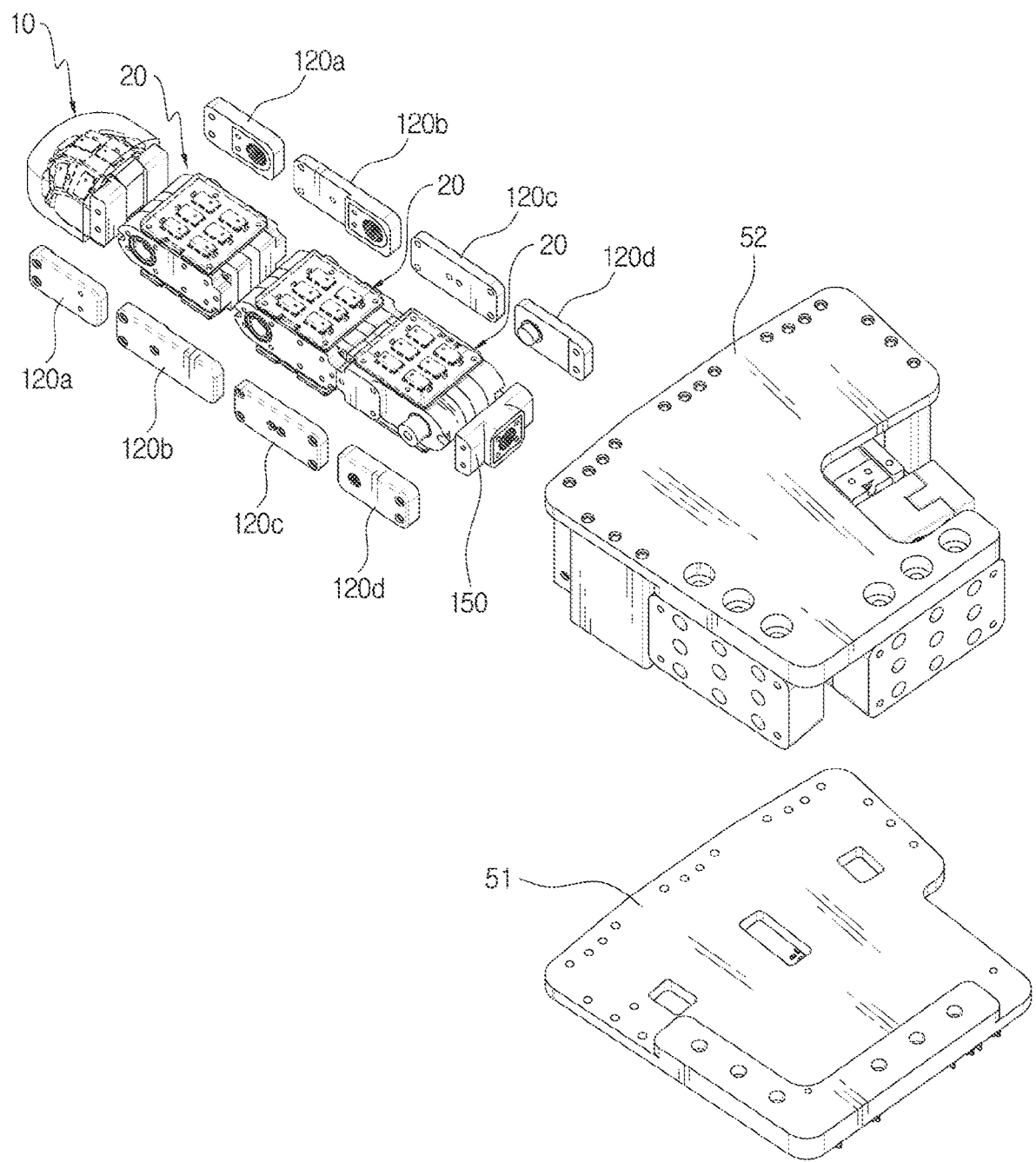
FIG. 2 is a schematic exploded perspective view showing some components of the robot-hand depicted in FIG. 1.

FIG. 1 is a schematic perspective view showing a robot-hand 100 having a tactile sensor module 10 according to the present disclosure, and FIG. 2 is a schematic exploded perspective view partially showing one finger 1 and a base 5 of the robot-hand 100 depicted in FIG. 1.

As shown in FIGS. 1 and 2, the robot-hand 100 to which the tactile sensor module 10 according to the present disclosure is mounted may include a plurality of fingers 1, and the finger 1 may be poly-articular and provided at more than one side of the base 5, in order to precisely control a grasping motion with a high degree of freedom when grasping an object M. Each finger 1 may be configured such that a tactile sensor module 10 and at least one phalange sensor modules 20 disposed therebelow in a longitudinal direction are pivotally connected by link members 120a, 120b, 120c, 120d. The base 5 may include a cover plate 52 mounted to an outer surface thereof, and a hand back control unit 51 capable of controlling a grasping force by generating a desired displacement signal based on information provided from the fingertip control unit 15 and the phalange control unit 25.

In the present disclosure, when grasping a soft object with low deformation resistance, the stiffness of the object M is measured to eliminate undesired deformation of the object M caused by an excessive grasping force, and the object M is grasped with a grasping strategy corresponding to the identified softness of the object M. The robot-hand 100 according to the present disclosure may perform a grasping motion in a variety of ways, such as a tongs grasping way where the object M is picked with fingertips and a holding way where the object M is held with the entire finger 1. The fingertip is mainly used for precisely grasping the robot-hand 100, and the tactile sensor module 10 of the present disclosure has a three-dimensional structure capable of spatially detecting the force distribution. In this point of view, an embodiment where the stiffness and grasping state of the object M are figured using the tactile sensor module 10 rather than the phalange sensor module 20 is described below, but the present disclosure is not limited thereto.

Figure 3A:
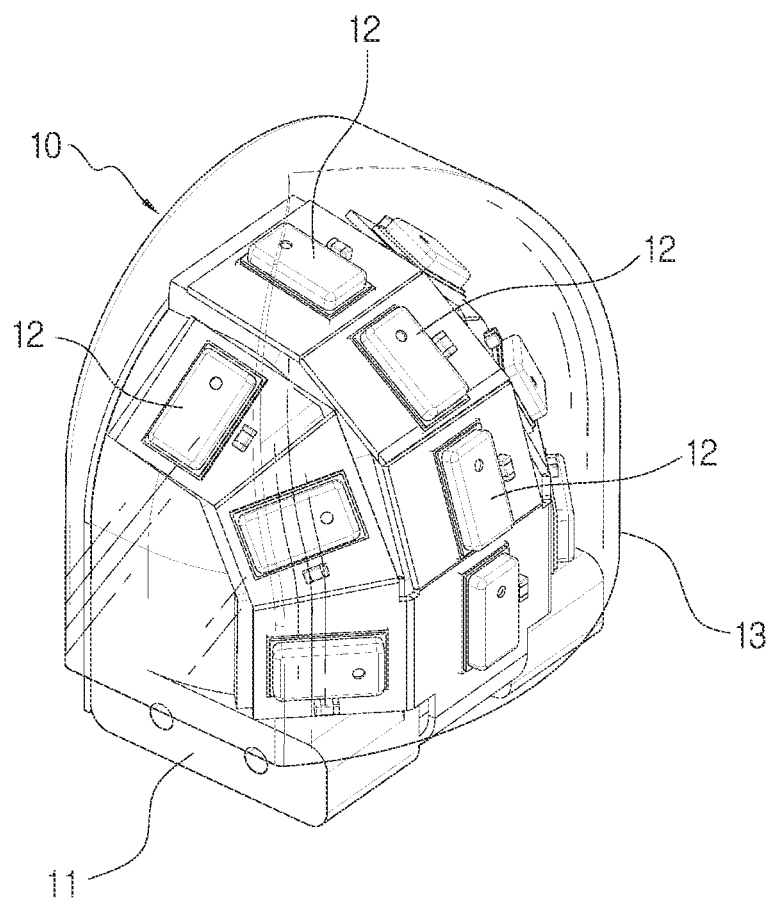
FIG. 3A is a schematic perspective view showing a tactile sensor module according to the present disclosure.
Figure 3B:
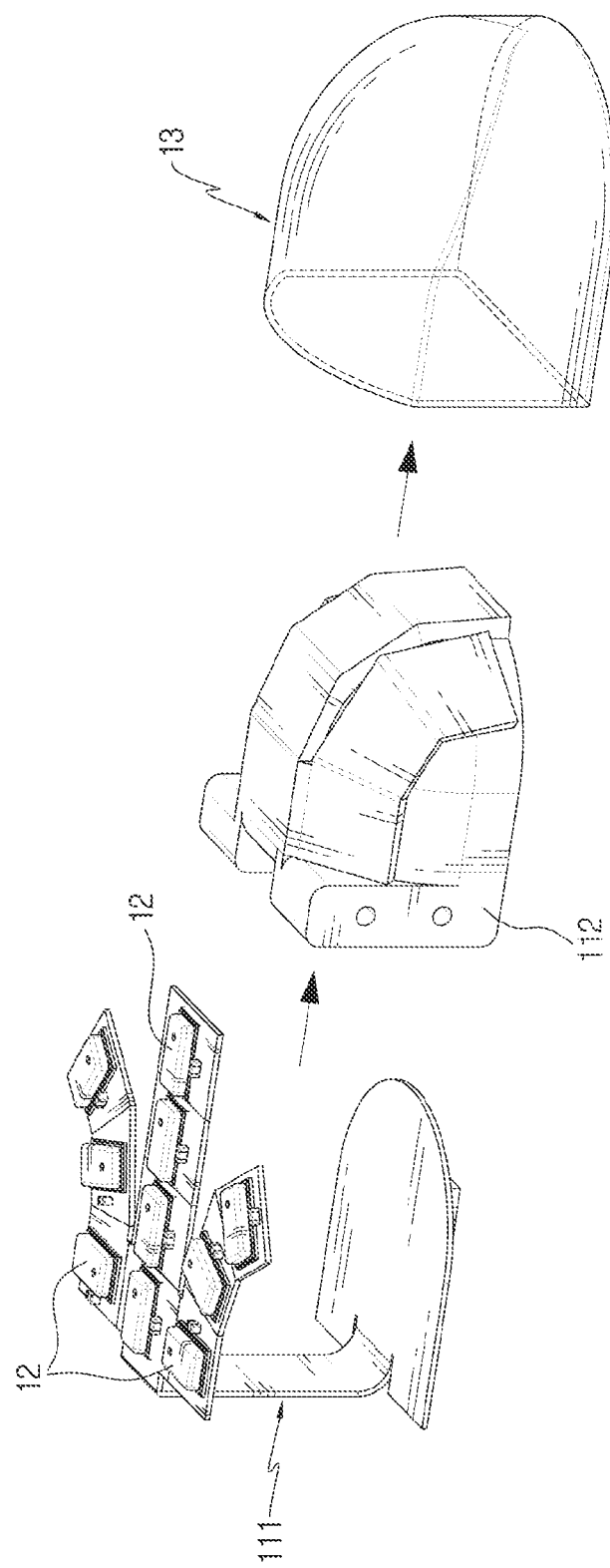
FIG. 3B is a schematic exploded perspective view showing the tactile sensor module depicted in FIG. 3A.
Figure 3C:
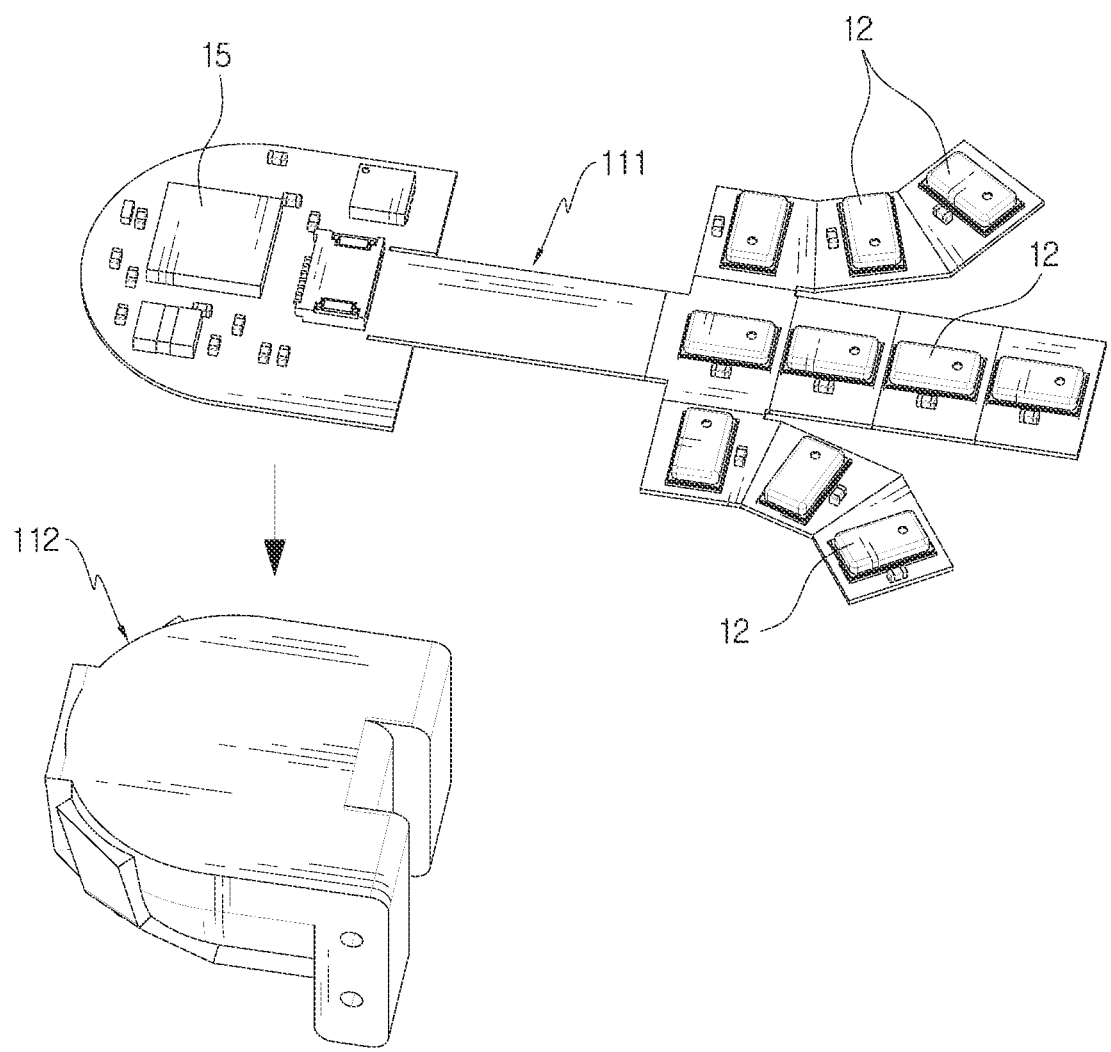
FIG. 3C is a schematic perspective view showing a state before a FPCB and a body block of a FPCB assembly depicted in FIG. 3A are coupled.
Figure 4A:
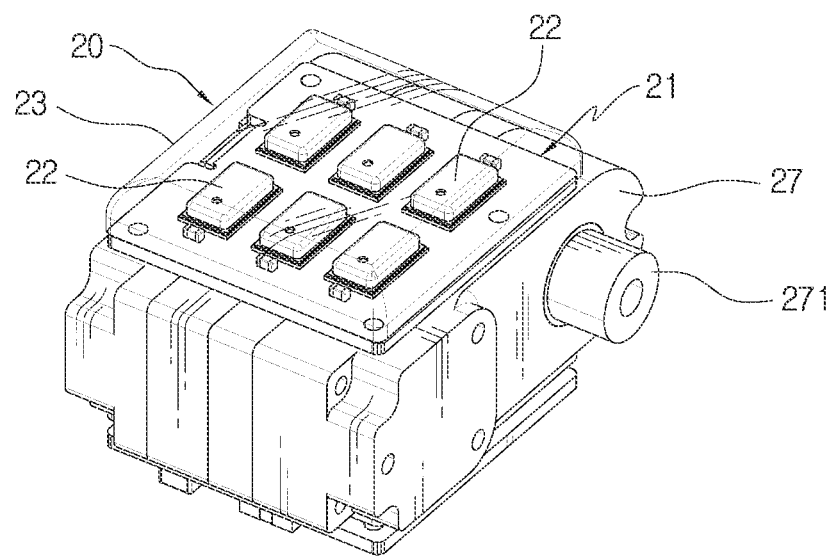
FIG. 4A is a schematic perspective view showing a phalange sensor module of the present disclosure.
Figure 4B:
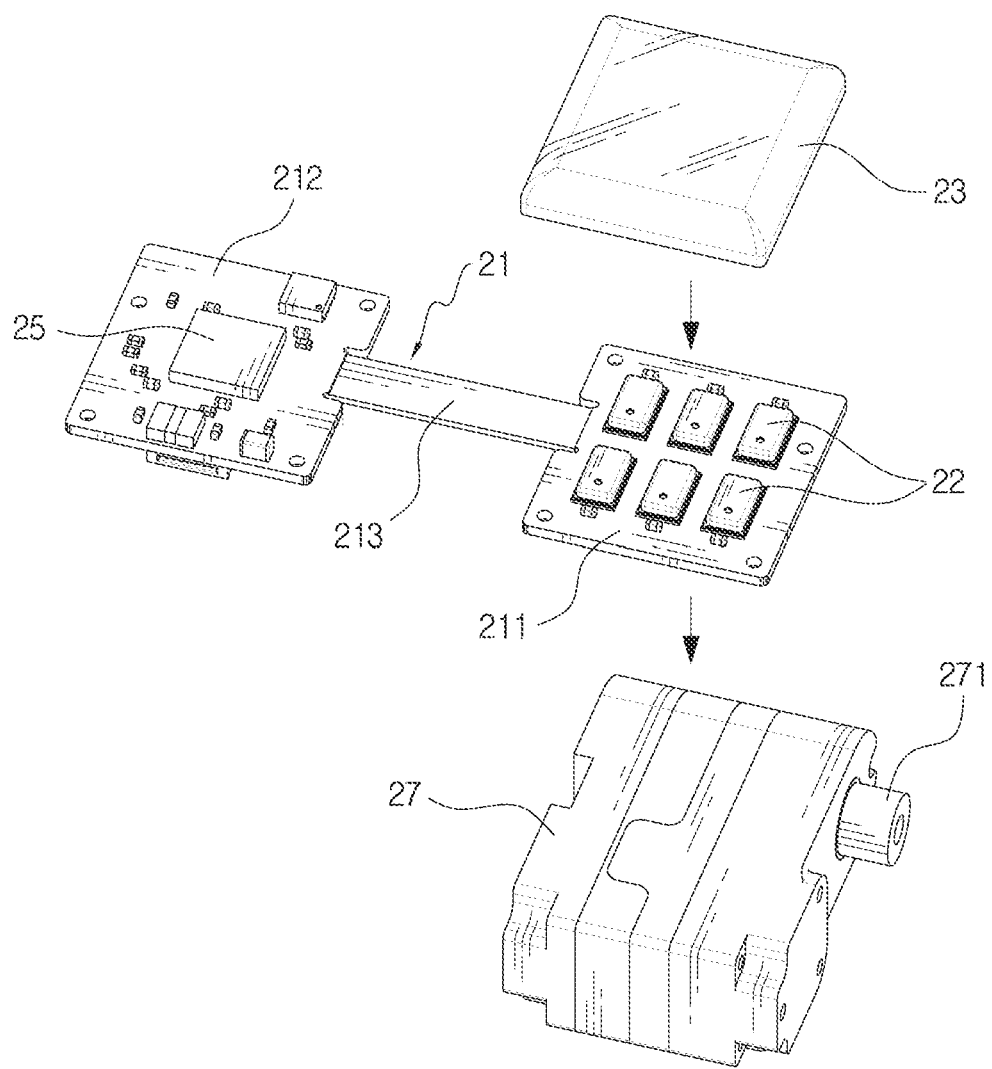
FIG. 4B is a schematic exploded perspective view showing the phalange sensor module depicted in FIG. 4A.

In addition, FIG. 3A is a schematic perspective view showing the tactile sensor module 10, FIG. 3B is an exploded perspective view showing the tactile sensor module 10 of FIG. 3A, and FIG. 3C is a perspective view showing a state before a FPCB 111 and a body block 112 of a FPCB assembly 11 of FIG. 3A are coupled. FIG. 4A is a schematic perspective view showing the phalange sensor module 20 of the present disclosure, and FIG. 4B is an exploded perspective view showing the phalange sensor module 20 of FIG. 4A.

As illustrated in FIGS. 3A to 3C, the tactile sensor module 10 may include a force sensor 12 for receiving and measuring a normal force applied by the object M during a grasping motion, a FPCB (Flexible Printed Circuit Board) assembly 11 having a three-dimensional structure to include an inclined surface on which the force sensor 12 is mounted to form a plurality of rows and electrically connected to the force sensor 12, a stress transfer element 13 formed at an upper portion of the FPCB assembly 11 to transfer the normal force applied by the object M to the force sensor 12, and a fingertip control unit 15 for collecting and outputting the normal force data measured by the force sensor 12. The force sensor 12 may be a barometric pressure sensor capable of measuring atmospheric pressure. In addition, the force sensor 12 used in the present disclosure may be a magnetic hall sensor, an integrated fiber bragg grating sensor, or the like. Preferably, the force sensor 12 is a barometric pressure sensor because it has a relatively simple configuration and a small volume compared to an optical sensor and is thus suitable to be integrated into the tactile sensor module 10.

As illustrated in FIG. 3B, the FPCB assembly 11 may include an FPCB 111 configured such that a plurality of force sensors 12 are attached to an outer surface thereof facing a grasping direction, and a body block 112 having a polyhedral shape. The FPCB 111 may be bended from a developed state illustrated in FIG. 3C into the shape which allows FPCB 111 to be mounted on the inclined surface of the body block 112, which has different angles, so as to be coupled to the body block 112. In addition, the FPCB 111 may be electrically connected to the force sensor 12 installed at the outer side to supply a power to the force sensor 12. According to the FPCB assembly 11 having the above three-dimensional structure, when a soft object M with low stiffness is grasped, the object M is deformed while the normal force applied to the fingertip is spatially distributed on the contact surface, and the position of the normal force can be detected with such a higher density compared to that of a flat structure.

The stress transfer element 13 may be formed at an upper portion of the FPCB assembly 11 to be spaced apart therefrom and accommodate the force sensor 12 between the stress transfer element 13 and the FPCB assembly 11 to transfer a normal force applied to the fingertip to the force sensor 12. The stress transfer element 13 is preferably made of an elastic material capable of elastic deformation, since its deformation characteristic has a large influence on the sensing performance of the sensor. In addition, the stress transfer element 13 may be formed on the FPCB assembly 11 by casting and curing. At this time, before curing a liquid casting material, the air trapped in the material may be degassed through a pump or the like during the casting process so as not to affect the sensor performance. In addition, the thickness and material of the stress transfer element 13 may be set in consideration of an influence on force measurement amount, resolution, linearity and hysteresis, which are sensing performances of the force sensor 12. In one example, the stress transfer element 13 of the tactile sensor module 10 may be made of a urethane rubber.

The fingertip control unit 15 is configured to collect and correct normal force data measured by the plurality of force sensors 12 installed at the FPCB assembly 11 and to communicate with the hand back control unit 51 to transfer the force data. Also, the drawings show that the fingertip control unit 15 may be mounted at one side of the tactile sensor module 10. According to the tactile sensor module 10 of the present disclosure, since a data processing module may be integrated into the tactile sensor module 10 without preparing a separate data processing unit outside, the tactile sensor system may be simplified and the installation efficiency may be improved.

As shown in FIGS. 3A and 3B, each phalange of the finger 1 may consist of the phalange sensor module 20. The phalange sensor module 20 may include a force sensor 22 for receiving and measuring a normal force applied to the phalange when grasping the object M, a PCB (Printed Circuit Board) assembly 21 having a first PCB 211, a second PCB 212 and a connection FPCB 213 to supply a power to the force sensor 22 and configured such that the plurality of force sensors 22 are attached to an outer surface thereof, a stress transfer plate 23 formed at an upper portion of the first PCB 211 to be spaced apart therefrom and accommodating the force sensor 22 in a space between the stress transfer plate 23 and the first PCB 211 to transfer the normal force applied by the object to the force sensor 22, a phalange control unit 25 for collecting, correcting and outputting the normal force data measured by the force sensor 22, and an actuator 27 for generating a driving force to pivot the fingertip and the phalange sensor modules 10, 20 connected by the link members 120a, 120b, 120c, 120d around a link shaft 271. The phalange sensor module 20 may further include a position sensor 28 provided to the actuator 27 to measure a rotational displacement of the motor. Also, the phalange control unit 25 collects and outputs the rotational displacement measured by the position sensor 28, and may be configured to drive the actuator 27 using a desired displacement signal received from the hand back control unit 51.

As illustrated in the drawing, the PCB assembly 21 may be configured such that the first PCB 211 and the second PCB 212 are connected by the connection FPCB 213 made of a strip-shaped member in a state of being disposed to face each other, in an example. At this time, the first PCB 211 may be arranged to face the grasping direction of the finger 1, and the second PCB 212 may be arranged at an opposite side to the first PCB 211 with the actuator 27 being interposed therebetween. On the surface of the first PCB 211, the plurality of force sensors 22 for receiving and measuring a normal force applied to the phalange when grasping the object M may be attached to form in a row, and the first PCB 211 may be electrically connected to the force sensor 22 to supply a power thereto. The force sensor 22 of the phalange sensor module 20 may be a barometric pressure sensor as the force sensor 12 of the tactile sensor module 10, and components of the PCB assembly 21 may be made of FPCB.

The stress transfer plate 23 may be formed at an upper portion of the first PCB 211 to be spaced therefrom to accommodate the force sensor 22 in a space between the stress transfer plate 23 and the first PCB 211, and transfer the normal force applied to the phalange by the object M to the force sensor 22. Similar to the tactile sensor module 10, the stress transfer plate 23 is preferably made of an elastic material to be deformed elastically. Like the stress transfer element 13 of the tactile sensor module 10, the stress transfer plate 23 may be formed in a flat plate on the upper portion of the first PCB 211 by casting and curing, and degassing may be performed during the casting process. Meanwhile, the thickness and material of the stress transfer plate 23 may be set in consideration of its effect on the sensing performance of the force sensor 22, and in an example, the stress transfer plate 23 may be formed by silicone molding material (e.g. PDMS).

The actuator 27 may be installed between the first and second PCBs 211, 212 and be electrically connected to the PCB assembly 21. One side of the actuator 27 is connected through the link members 120a, 120b, 120c, 120d and the link shaft 271, which is a transverse rotational shaft, so that tactile sensor modules 10 or the phalange sensor modules 20 arranged up and down may be pivotally connected to each other around the link shaft 271. The actuator 27 may receive a velocity command from the phalange control unit 51 and generates a driving force for pivoting the fingertips and the phalange sensor modules 10, 20 connected by the link members 120a, 120b, 120c, 120d around the link shaft 271. The actuator 27 may have a motor, and a position sensor 28 for measuring a rotational displacement of the motor generated when grasping may be installed at a shaft end of the motor for calculating the stiffness of the object M.

The phalange control unit 25 of the phalange sensor module 20 may be configured to collect and correct the normal force data measured by the plurality of force sensors 22 attached to the PCB assembly 21, and collect the rotational displacement data measured by the position sensor 28 attached to the actuator 27. Moreover, the phalange control unit 25 may be configured to communicate with the hand back control unit 51 to transfer said normal force data and said rotational displacement data thereto, and control the position and speed of the motor of the actuator 27 based on the desired displacement received from the hand back control unit 51. The phalange control unit 25 may be located on the second PCB 212 as illustrated in FIG. 4B.

Figure 5A:
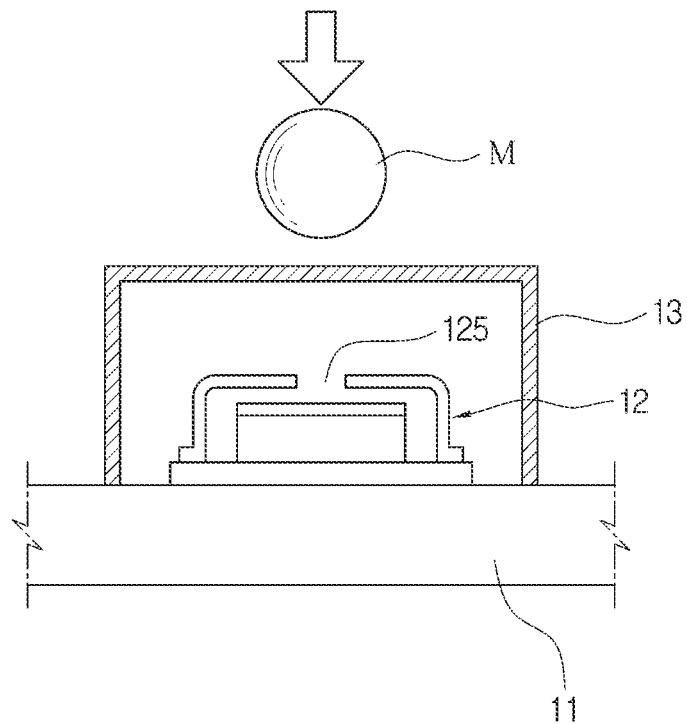
FIGS. 5A and 5B show schematic cross-sectional views sequentially showing an operation process of a force sensor according to the present disclosure, respectively.
Figure 5B:
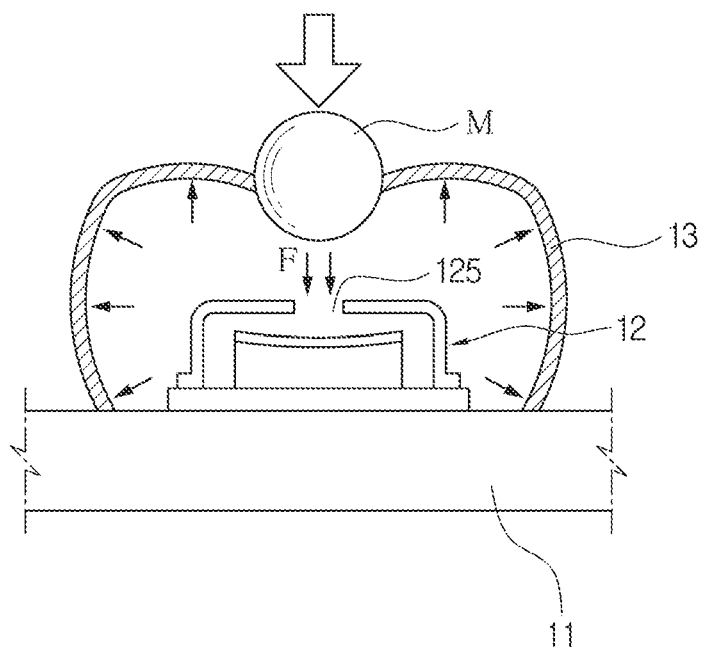

FIGS. 5A and 5B shows schematic cross-sectional views sequentially showing the operation of the force sensor 12, respectively. FIG. 5A shows a state before the object M contacts the stress transfer element 13 at a grasping motion. FIG. 5B shows that the stress transfer element 13 contacts the object M, receiving a normal force (F) applied by the same. The stress transfer element 13 may transfer the normal force (F) to the force sensor 12 while being elastically deformed by the normal force F, as illustrated in FIG. 5B. Accordingly, a diaphragm located inside a sensing hole 125 of the force sensor 12 is stimulated, the intensity of the normal force (F) being measured by the force sensor 12. In the drawings, the force sensor 12 is illustrated as a barometric pressure sensor, but the type and shape of the sensor are not limited thereto. In addition, although the force sensor 12 of the tactile sensor module 10 is illustrated in the drawings, the operation process described above may be also applied to the force sensor 22 of the phalange sensor module 20 in the same way.

Figure 6:
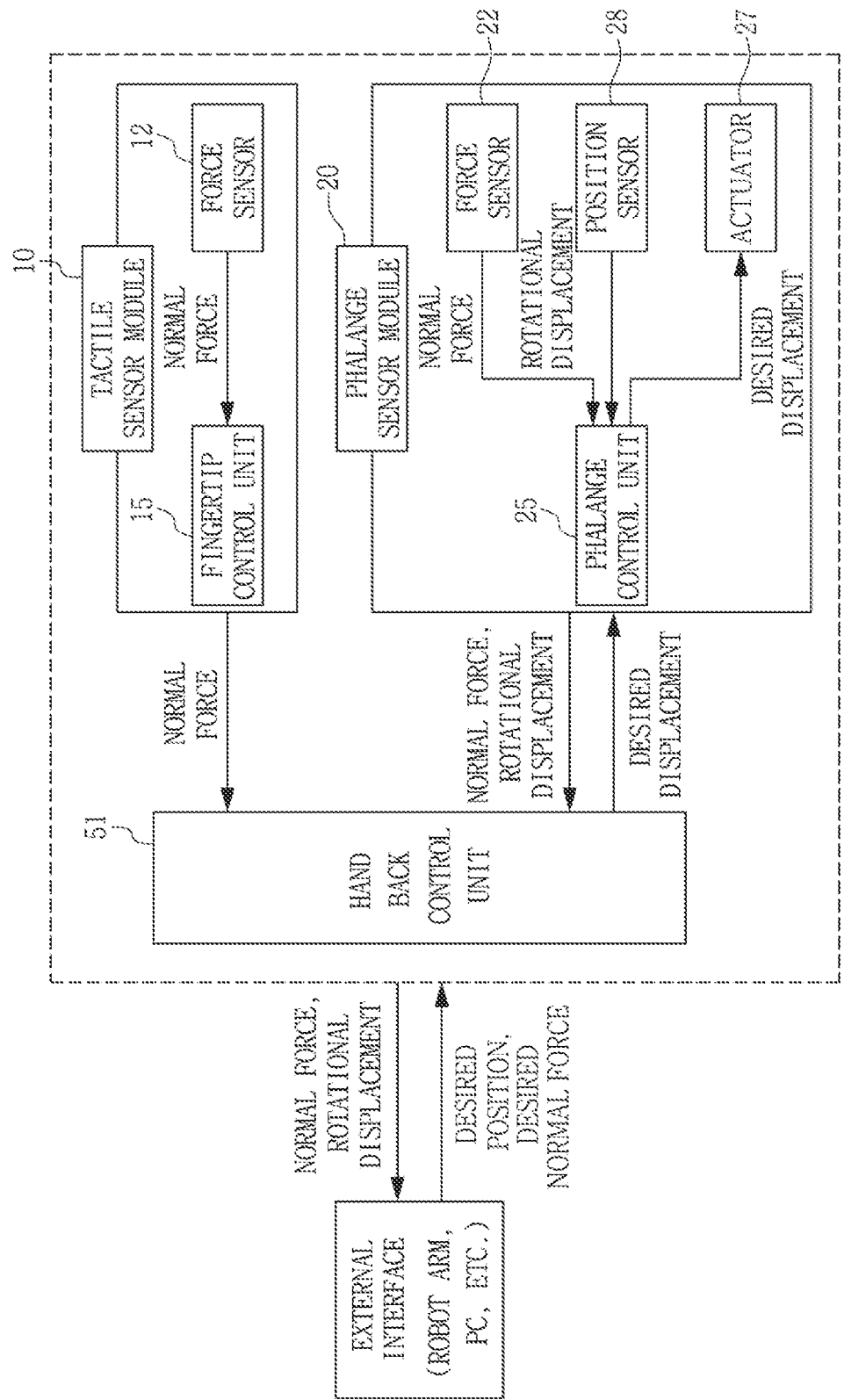
FIG. 6 is a schematic diagram showing a control-related configuration of the present disclosure and its operation.

FIG. 6 is a schematic diagram showing a control-related configuration of the present disclosure and its operation. As described above, the normal force data measured by the force sensor 12 is transmitted to the hand back control unit 51 through the fingertip control unit 15. The normal force data measured by the force sensor 22 and the rotational displacement data measured by the position sensor 28 are transmitted to the hand back control unit 51 through the phalange control unit 25. In an example, as a configuration for communicating with the hand back control unit 51, an external interface such as a robot arm or a PC may be provided outside the robot-hand 100. The external interface may be configured to quantitatively calculate the stiffness of the object M from the received normal force and displacement data and indirectly figure out the softness of the object M from the stiffness. Moreover, the external interface may generate a desired position signal and a desired normal force signal and transmit the same to the hand back control unit 51 so that an appropriate grasping strategy is performed according to the identified softness. The hand back control unit 51 may generate a desired displacement signal by integrating the received desired position signal and the received force signal, and then transmit the desired displacement signal to the actuator 27 so that the actuator 27 generates a driving force for operating the finger 1. That is, the hand back control unit 51 can be configured to control the grasping force of the finger 1 based on the identified softness of the object M.

Figure 7A:
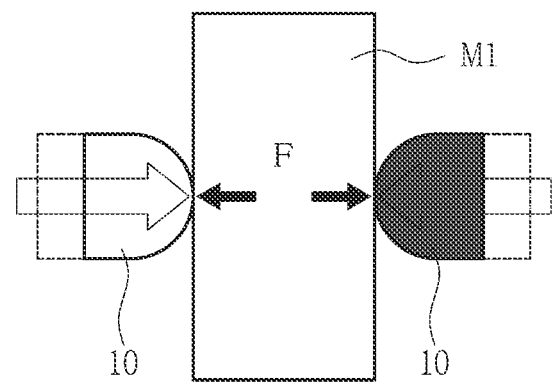
FIGS. 7A to 7C show side views schematically showing the change of an appearance of objects according to a normal force when the objects with different softness are grasped, respectively.
Figure 7B:
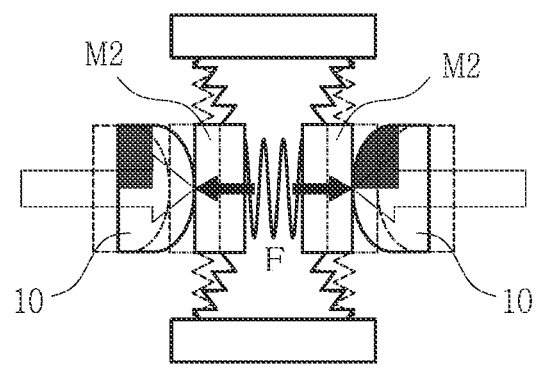
Figure 7C:
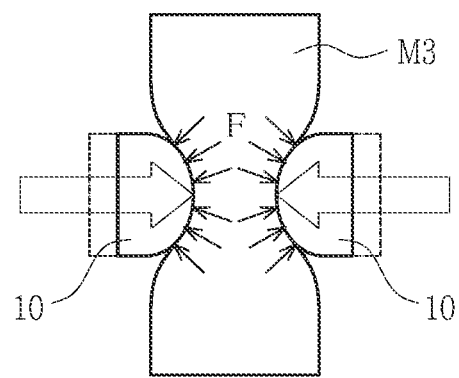

In an example, the hand back control unit 51 may transfer a desired rotational displacement to the phalange control unit 25 as a digital signal, and the phalange control unit 25 may apply the received signal to the actuator 27 by means of pulse width modulation (PWM) in order to control the position of the motor. In addition, in controlling the rotation angle of the actuator 27, in an example, a position sensor 28 may be installed at a shaft end of a servo motor of the actuator 27, and the phalange control unit 25 may generate a desired displacement signal based on the rotational displacement measured by the position sensor 28. The rotation angle of the actuator 27 is controlled according to the desired displacement signal. At this time, the phalange control unit 25 may include a position servo system which tracks and automatically control the position of the servo motor, for controlling the position of the servo motor of the actuator 27 based on the desired displacement signal received from the hand back control unit 51. FIGS. 7A to 7C show side views schematically showing the change of an appearance of the object M according to the normal force (F) when grasping objects M with different softness, respectively. As illustrated, the robot-hand 100 brings the fingertip into contact with a contact surface of the object M vertically and a grasping force is applied to make a grasping motion. At this time, a normal force (F) including a reaction force induced in the vertical direction by the object M is applied to the contact surface of the fingertip. At the same time, the object M deforms in inverse proportion to the stiffness of the contact surface to which the grasping force is applied in a vertical direction. The object M may be classified as follows according to the softness characteristics: a first type object M1 (wood, metal, glass material, etc.) whose overall shape and surface are hardly deformed even when a large external force is applied, as illustrated in FIG. 7A; a second type object M2 (paper, plastic, etc.) whose entire shape is easily deformed but the surface is hardly deformed, as illustrated in FIG. 7B; and a third type object M3 (sponge, fruit, etc.) whose overall shape and surface to which the external force is applied are easily deformed, as illustrated in FIG. 7C.

According to the present disclosure, it is possible to identify the types of the object M using the tactile sensor module 10. In the case of the first type object M1, as shown in the drawings, if the tactile sensor module 10 contacts the object M1 and applies a grasping force in vertical direction thereto, only a normal force including a reaction force caused by the object M1 is mainly applied to the contact surface of the fingertip. Accordingly, only the force sensor 12 at a middle region is activated which firstly contacts the object M1 on the contact surface of the tactile sensor module 10. In the case of the second type object M2, the entire shape of the object M2 is deformed rather than the surface when being grasped, and the reaction force against the grasping force is applied greatly on the fingertip, so the force sensor 12 at the middle region is activated, like the first type object M1. In addition, when the second type object M2 is grasped, its entire shape is deformed with a rotational displacement of the motor, it is possible to distinguish the second type object M2 from the first type object M1 by using the rotational displacement data measured by the position sensor 28. Accordingly, different grasping strategies can be applied to the first and second type objects M1, M2 respectively as described later. In the case of the third type object M3, when being grasped, not only the shape of the object M3 but also the surface thereof is easily deformed in inverse proportion to the stiffness of the contact surface to which the normal force is applied. In addition, as shown in FIG. 7C, the normal force due to the third type object M3 is applied on the contact surface of the fingertip as a form of spatially distributed force. At this time, the stress transfer element 13 of the tactile sensor module 10 is elastically deformed, and not only the middle force sensor 12 but also the periphery force sensor 12 adjacent to the middle force sensor 12 is activated. The tactile sensor module 10 of the present disclosure can detect the distribution of the normal force dispersed from the position of the activated force sensor 12 when grasping, and this is due to the dense configuration in which the force sensors 12 are arranged on the three-dimensional FPCB assembly 11. By finding the position of the normal force distributed as above, it is possible to figure out whether the object is the third type object M3 and deformation state of the object M3.

In the present disclosure, when grasping a soft object with low deformation resistance, different grasping strategies are applied according to the type of the object M in order to minimize the deformation of the object M due to the application of an excessive grasping force. Since the first type object M1 has a characteristic that is difficult to be deformed, there is no need to adapt to the softness of the object M1 when grasping. In the case of the second and third type objects M2, M3, grasping motion is accomplished controlling grasping force of the robot-hand 100 according to the measured stiffness of them. The stiffness of the second and third type objects M2, M3 may be calculated from the normal force data which is measured and corrected by the force sensor 12 and the rotational displacement data measured by the position sensor 28, as described above.

Figure 8:
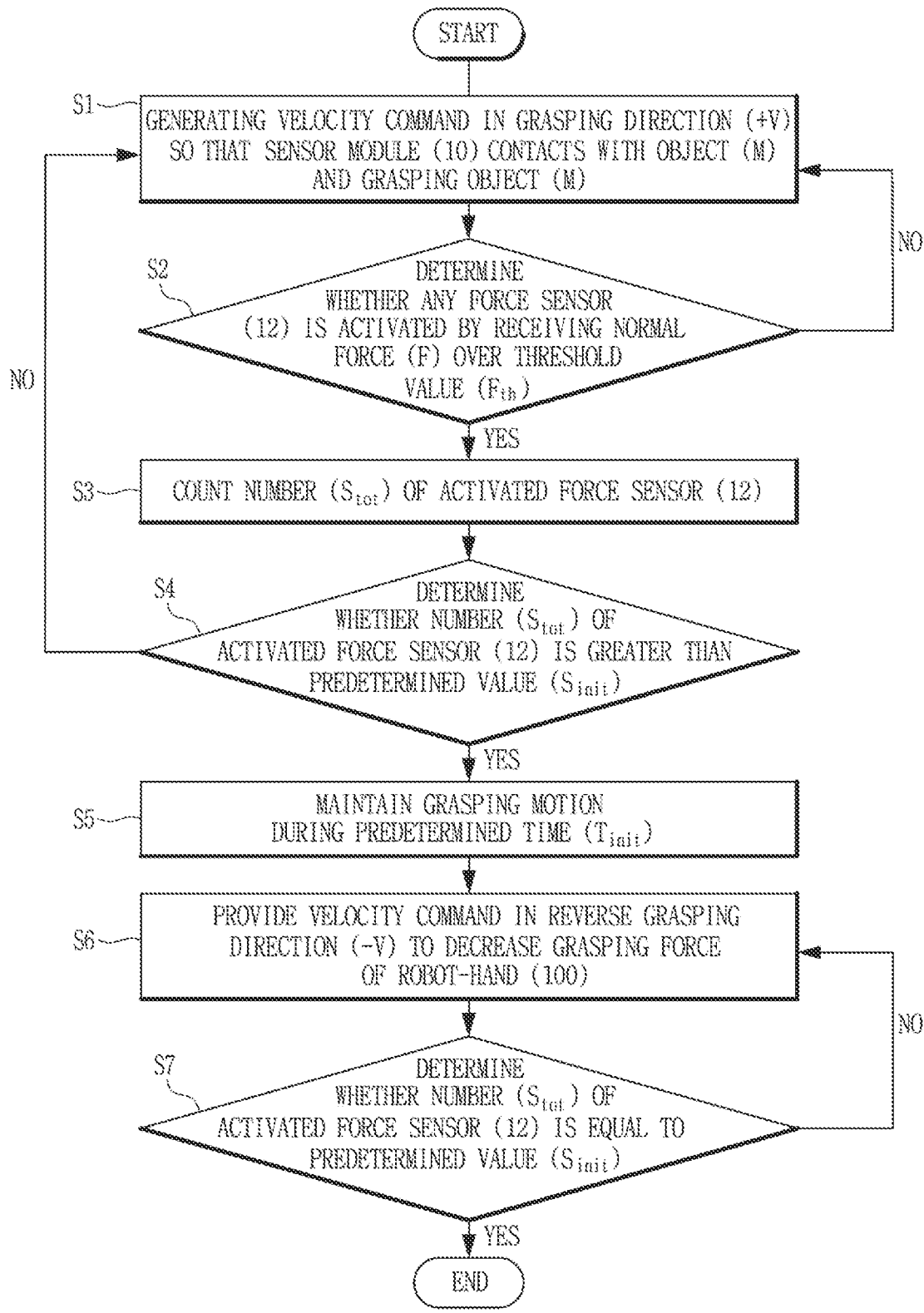
FIG. 8 is a schematic flowchart for illustrating a method of controlling a grasping force of the robot-hand according to the present disclosure.
Figure 9A:
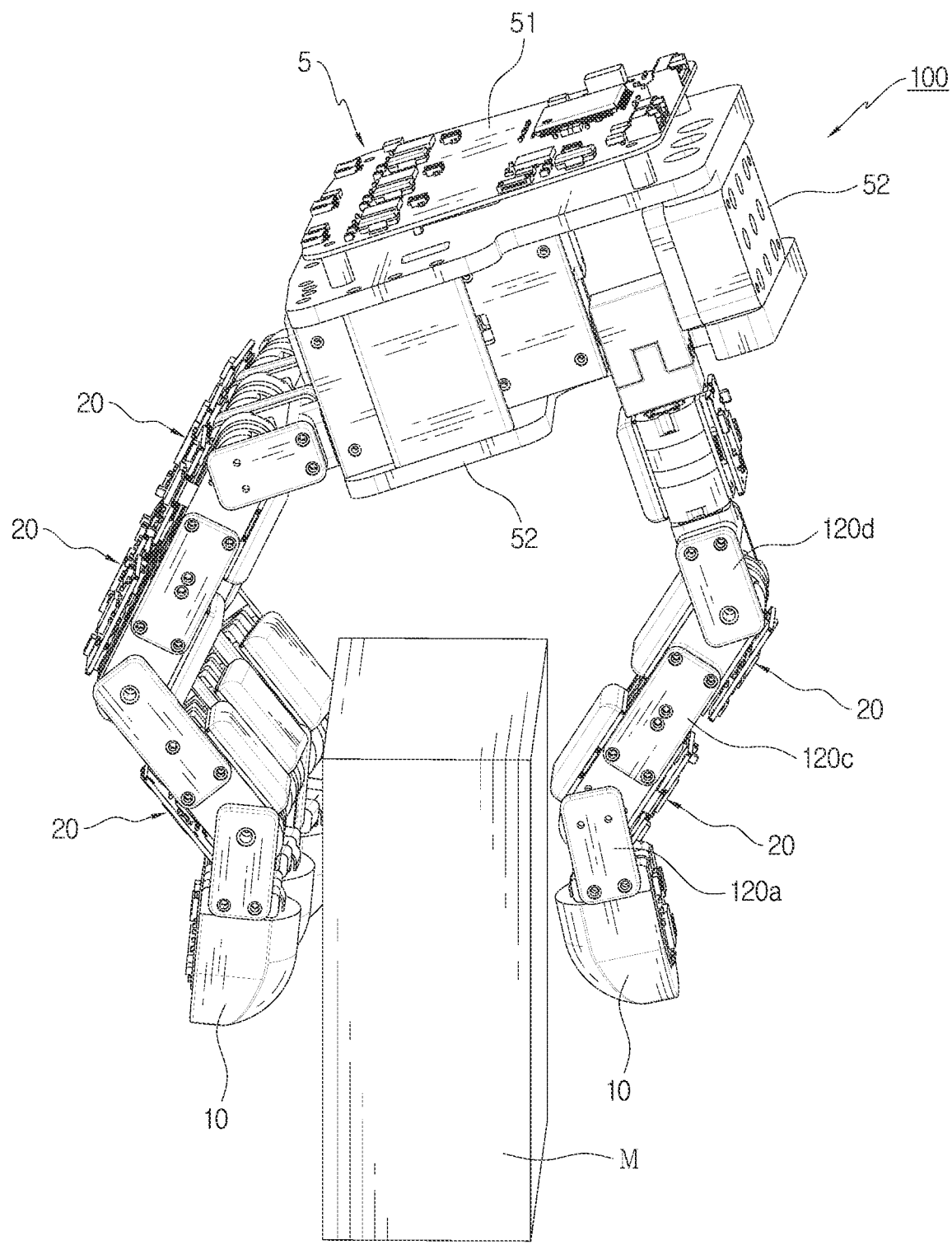
FIGS. 9A and 9B is a schematic perspective view showing that the robot-hand according to the present disclosure grips a soft object.
Figure 9B:
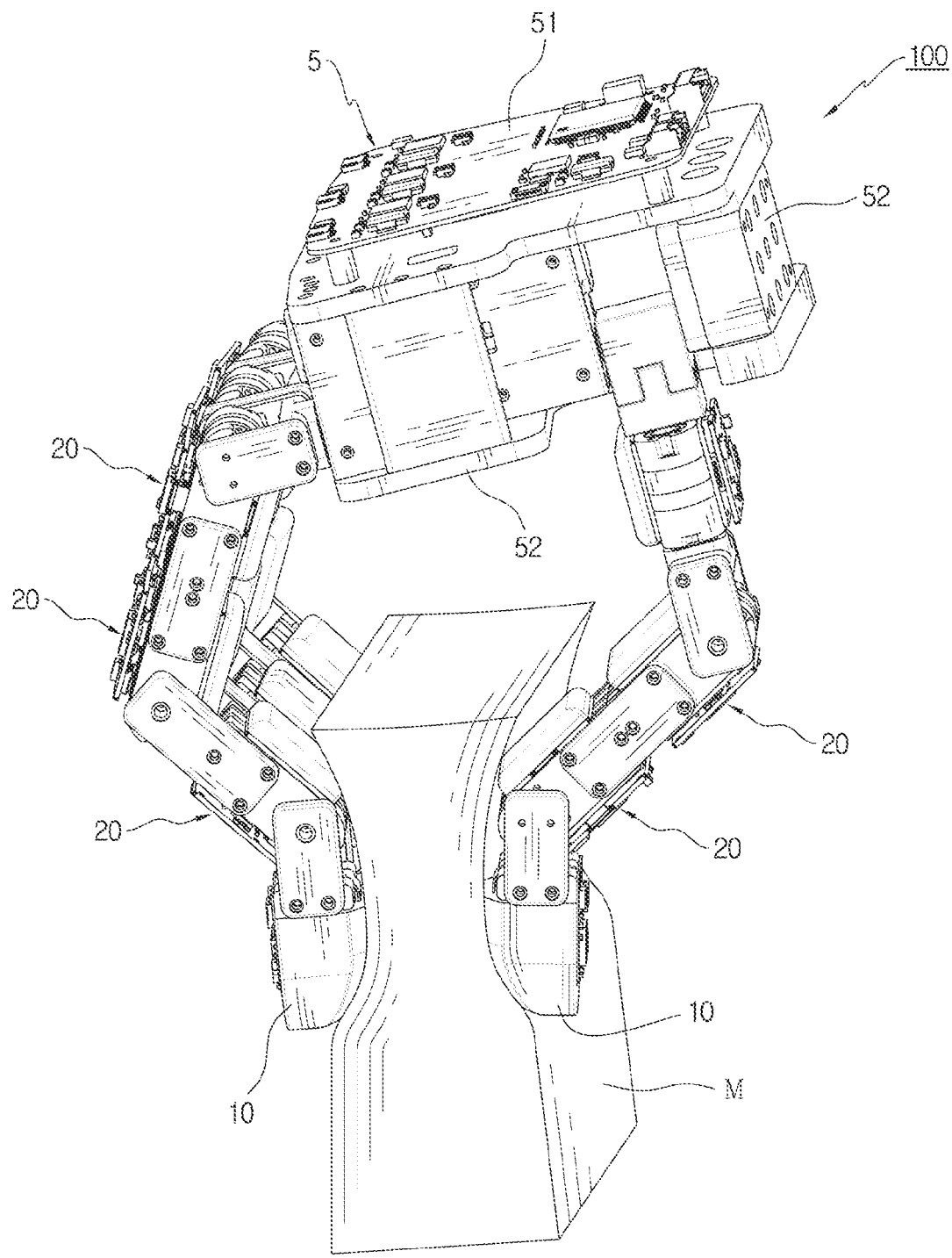

FIG. 8 is a schematic flowchart for illustrating a method of controlling a grasping force of the robot-hand 100 when grasping the third type object M3 in the present disclosure. FIGS. 9A and 9B are schematic perspective views showing that the third type object M3 is grasped using the robot-hand 100 including the tactile sensor module 10 of the present disclosure. The present disclosure is intended to grasp accurately the third type object M3 which is soft with the smallest grasping force of which degree occurs no sliding and minimized deformation of the object M3 when grasping it. According to an embodiment, as described above, the desired displacement signal based on the measured stiffness of the third type object M3 is generated from the hand back control unit 51 and transferred to the phalange control unit 25. The desired displacement signal is provided to the actuator 27 by the phalange control unit 25 to generate a driving force corresponding to the desired displacement signal. In this way, the grasping force of the robot-hand 100 can be controlled.

To grasp the object M with the robot-hand 100, the phalange control unit 25 generates a velocity command in the grasping direction (+V) as an initial grasping signal. Accordingly, the actuator 27 of the phalange sensor module 20 is operated, thereby approaching the object M as illustrated in FIG. 9A. Accordingly, as illustrated in FIG. 9B, the tactile sensor module 10 makes a grasping motion in the way of contacting and picking the object M. At this time, the entire shape and surface of the third type object M3 are elastically deformed due to the grasping force of the robot-hand 100 as shown in the drawings (S1).

Subsequently, it is determined whether the force sensor 12 is activated as normal force (F) over a threshold value ($F_{th}$) is applied to any force sensor 12 provided in the tactile sensor module 10. The phalange control unit 25 generates the velocity command in the grasping direction (+V) until at least one force sensor 12 is activated (S2).

If there is an activated force sensor 12, the number ($S_{tot}$) of activated force sensors 12 is counted (S3), and it is determined whether the number ($S_{tot}$) of activated force sensors 12 is greater than a predetermined value ($S_{init}$) (S4). As described above, since the stress transfer element 13 of the tactile sensor module 10 is made of an elastic material, the stress transfer element 13 is elastically deformed when grasping the object M. Accordingly, the middle force sensor 12 is activated first, and the periphery force sensors 12 are activated from one adjacent to the middle force sensor 12. In the case of the first and second type objects M1, M2, since only the middle force sensor 12 is actually activated, the number ($S_{tot}$) of force sensors 12 would not exceed the predetermined value ($S_{init}$), so the steps from S1 to S4 are repeated.

In the case of the third type of object M3, a normal force (F) over the threshold value ($F_{th}$) is applied to the periphery force sensor 12 as well as the middle force sensor 12, so the number ($S_{tot}$) of activated force sensors 12 can exceed the predetermined value ($S_{init}$). In this case, subsequently, the grasping motion of the robot-hand 100 is maintained during a predetermined time ($T_{init}$) (S5). Since the deformation state of the object M3 is maintained during the predetermined time ($T_{init}$), it is more preferable, the closer the predetermined time ($T_{init}$) is to 0. Subsequently, until the number ($S_{tot}$) of activated force sensors 12 becomes equal to the predetermined value ($S_{init}$), the velocity command in the reverse grasping direction (−V) is generated to reduce the grasping force of the robot-hand 100. If the number ($S_{tot}$) of the activated force sensor 12 becomes equal to the predetermined value ($S_{init}$), the grasping force is maintained and the object M3 is stably grasped with only minimal deformation in the third type object M3 which is soft (S7). In addition, although the force sensor 12 of the tactile sensor module 10 is illustrated, it may also be similarly applied to the force sensor 22 of the phalange sensor module 20.

Using the above grasping strategy, in order to grasp the object safely and accurately, only minimum grasping force is applied to make the grasping motion of the robot-hand, of which degree is sufficient for accurately grasping the object with no sliding and minimized deformation, and which is determined by the softness of the object identified based on the intensity and distribution of the force detected by the tactile sensor module. In addition, since the stiffness of the object, which is tactile information based on the information measured by the sensor module of the finger, is provided as feedback information to the hand back control unit capable of tactile feedback, an operator of the robot-hand may perceive the inherent characteristics and the grasping state of the object by tactile sense.

LIST OF REFERENCE NUMERALS

100: robot-hand
1: finger
5: base
10: tactile sensor module
11: FPCB assembly
111: FPCB
112: body block
12: force sensor
125: sensing hole
13: stress transfer element
15: fingertip control unit
20: phalange sensor module
21: PCB assembly
211 first PCB
212: second PCB
213: connection FBCB
22: force sensor
23: stress transfer plate
25: phalange control unit
27: actuator
271: link shaft
28: position sensor
51: hand back control unit
52: cover plate
120a, 120b, 120c, 120d: link member
150: base link member M: object
M1: first type object
M2: second type object
M3: third type object

What is claimed is:

1. A tactile sensor module for a robot-hand, comprising:
a force sensor configured to measure a normal force applied when the robot-hand is grasping an object;
a Flexible Printed Circuit Board (FPCB) assembly having an inclined surface to which the force sensor is mounted to form a plurality of rows, the FPCB assembly being configured to supply a power to the force sensor;
a stress transfer element formed at an upper portion of the FPCB assembly to be spaced apart therefrom to accommodate the force sensor therein, the stress transfer element being configured to transfer the normal force applied by the object to the force sensor; and
a fingertip control unit configured to collect, correct and output normal force data measured by the force sensor.

2. The tactile sensor module according to claim 1, wherein the stress transfer element is made of a urethane rubber and formed on the FPCB assembly by casting and curing.

3. A robot-hand, comprising:
a plurality of fingers, each having a tactile sensor module and a plurality of phalange sensor modules rotatably coupled by link members; and
a base connected with the plurality of fingers by a base link member and having a hand back control unit for controlling a grasping motion of the finger, the base having a cover plate installed at an outer surface thereof,
wherein the tactile sensor module is configured to measure a normal force applied when the robot-hand is grasping an object,
the phalange sensor module has an actuator to generate a driving force for a grasping motion and is configured to measure the normal force and a rotational displacement of a motor of the actuator when the robot-hand is grasping the object, and
the hand back control unit is configured to control a grasping force by receiving the normal force data and rotational displacement data from the tactile sensor module and the phalange sensor module.

4. The robot-hand according to claim 3,
wherein stiffness of the object is measured from said normal force data and said rotational displacement data, and
the hand back control unit generates a desired displacement signal based on the stiffness and transfers the desired displacement signal to the actuator in order to control the grasping force applied to the object.

5. The robot-hand according to claim 3,
wherein the tactile sensor module includes:
a force sensor configured to measures the normal force applied when the robot-hand is grasping the object;
a FPCB assembly having an inclined surface to which the force sensor is mounted to form a plurality of rows, the FPCB assembly being configured to supply a power to the force sensor;
a stress transfer element formed at an upper portion of the FPCB assembly to be spaced apart therefrom to accommodate the force sensor therein, the stress transfer element being configured to transfer the normal force applied by the object to the force sensor; and a fingertip control unit configured to collect, correct and output normal force data measured by the force sensor.

6. The robot-hand according to claim 5,
wherein the stress transfer element is made of a urethane rubber and formed on the FPCB assembly by casting and curing.

7. The robot-hand according to claim 3,
wherein the phalange sensor module includes:
a force sensor configured to measure the normal force applied when the robot-hand is grasping the object;
a Printed Circuit Board (PCB) assembly having a first PCB having an outer surface on which a plurality of force sensors are attached and a second PCB coupled to face the first PCB by a connection FPCB, the PCB assembly being configured to supply a power to the force sensor;
a stress transfer plate formed at an upper portion of the first PCB to be spaced apart therefrom to accommodate the force sensor therein, the stress transfer plate being configured to transfer the normal force applied by the object to the force sensor;
a phalange control unit configured to collect, correct and output normal force data measured by the force sensor; and
an actuator installed between the first PCB and the second PCB to generate a driving force for a grasping motion.

8. The robot-hand according to claim 7,
wherein the motor of the actuator includes a position sensor for measuring a rotational displacement when the robot-hand is grasping the object, and
the phalange control unit is configured to collect and output the rotational displacement data, and to transfer said normal force data and said rotational displacement data to the hand back control unit.

9. The robot-hand according to claim 7,
wherein the stress transfer plate is made of a silicone molding material and formed on the PCB assembly by casting and curing.

10. A grasping method for grasping an object using a robot-hand having a tactile sensor module at a finger, the grasping method comprising:
generating a velocity command in a grasping direction so that the tactile sensor module contacts the object, and grasping the object by the robot-hand;
determining whether any force sensor provided to the tactile sensor module is activated as a normal force over a threshold value is applied to the force sensor;
counting a number of activated force sensors;
determining whether the number of activated force sensors is greater than a predetermined value;
maintaining a grasping motion of the robot-hand during a predetermined time;
generating a velocity command in a reverse grasping direction to decrease a grasping force of the robot-hand; and
determining whether the number of activated force sensors is equal to the predetermined value.

11. The grasping method according to claim 10,
wherein the robot-hand further includes a base connected to a plurality of fingers by a base link member, the base having a hand back control unit for controlling a grasping motion of the finger and a cover plate installed at an outer surface thereof,
the finger including a tactile sensor module and a plurality of phalange sensor modules rotatably coupled by link members, the tactile sensor module is configured to measure a normal force applied when the robot-hand is grasping the object,
a phalange sensor module has an actuator to generate a driving force for a grasping motion and is configured to measure the normal force and a rotational displacement of a motor of the actuator when the robot-hand is grasping the object, and
the hand back control unit is configured to control a grasping force by receiving normal force data and rotational displacement data from the tactile sensor module and the phalange sensor module.

12. The grasping method according to claim 11,
wherein stiffness of the object is measured from said normal force data and said rotational displacement data, and
the hand back control unit generates a desired displacement signal based on the stiffness and transfers the desired displacement signal to the actuator to control the grasping force applied to the object.

13. The grasping method according to claim 10,
wherein the tactile sensor module includes:
a force sensor configured to measure a normal force applied when the robot-hand is grasping the object;
a FPCB assembly having an inclined surface to which the force sensor is mounted to form a plurality of rows, the FPCB assembly being configured to supply a power to the force sensor;
a stress transfer element formed at an upper portion of the FPCB assembly to be spaced apart therefrom to accommodate the force sensor therein, the stress transfer element being configured to transfer the normal force applied by the object to the force sensor; and
a fingertip control unit configured to collect, correct and output normal force data measured by the force sensor.

14. The grasping method according to claim 11,
wherein the phalange sensor module includes:
a force sensor configured to measure a normal force applied when the robot-hand is grasping the object;
a PCB assembly having a first PCB having an outer surface on which a plurality of force sensors are attached and a second PCB coupled to face the first PCB by a connection FPCB, the PCB assembly being configured to supply a power to the force sensor;
a stress transfer plate formed at an upper portion of the first PCB to be spaced apart therefrom to accommodate the force sensor therein, the stress transfer plate being configured to transfer the normal force applied by the object to the force sensor;
a phalange control unit configured to collect, correct and output normal force data measured by the force sensor; and
an actuator installed between the first PCB and the second PCB to generate a driving force for a grasping motion.

15. The grasping method according to claim 14,
wherein the motor of the actuator includes a position sensor for measuring a rotational displacement when the robot-hand is grasping the object, and
the phalange control unit is configured to collect and output the rotational displacement data, and to transfer said normal force data and said rotational displacement data to the hand back control unit.

* * * * *